(12) United States Patent
Hartmann (10) Patent No.: US 6,863,813 B2
(45) Date of Patent: Mar. 8, 2005

(54) MEMBRANE MODULE (75) Inventor: Eduard Hartmann, Schneisingen (CH)

(73) Assignee: Bucher Guyer AG, Schneisingen (DE)

( * ) Notice: Subject to any disclaimer, the term of this patent is extended or adjusted under 35 U.S.C. 154(b) by 0 days.

(21) Appl. No.: 10/182,663

(22) PCT Filed: Jan. 30, 2001

(86) PCT No.: PCT/CH01/00071
§ 371 (c)(1),
(2), (4) Date: Jul. 31, 2002

(87) PCT Pub. No.: WO01/58574
PCT Pub. Date: Aug. 16, 2001

(65) Prior Publication Data
US 2003/0080041 A1 May 1, 2003

(30) Foreign Application Priority Data
Feb. 8, 2000 (DE) .......................................... 100 05 436

(51) Int. Cl.[7] .............................................. B01D 63/00
(52) U.S. Cl. ............. 210/321.83; 210/650; 210/321.85; 210/321.89; 96/8
(58) Field of Search ...................... 210/321.83, 321.85, 210/321.88, 497.1, 650; 96/4–10

(56) References Cited

U.S. PATENT DOCUMENTS 6,190,555 B1 * 2/2001 Kondo ....................... 210/615

FOREIGN PATENT DOCUMENTS

WO        WO 98/19778    * 5/1998

* cited by examiner

Primary Examiner—W. L. Walker
Assistant Examiner—Krishnan S Menon
(74) Attorney, Agent, or Firm—Cohen, Pontani, Lieberman & Pavane (57) ABSTRACT

A membrane module for a device used to separate substance mixtures in a cross current method includes a number of tubular membranes which encircle, at least in sections, a common axis in an essentially helical manner and which are provided for forming an essentially disk shaped module. At least two of the tubular membranes encircle a common spiral axis in a helical manner, the membranes being preferably twisted like a cable, at least along the progression of a part of their essentially helical encircling in order to form a tubular membrane strand.

16 Claims, 8 Drawing Sheets

MEMBRANE MODULE

PRIORITY CLAIM

This is a U.S. national stage of PCT application No. PCT/CH01/00071, filed on Jan. 30, 2001. Priority is claimed on that application and on the following application: Country: Germany, Application No.: 100 05 436.6, Filed: Feb. 08, 2000.

BACKGROUND OF THE INVENTION

1. Field of the Invention

The invention relates to a membrane module for a device for separating substance mixtures in the crossflow process with a plurality of tube membranes which, at least in certain portions, run substantially spirally around a common axis to form a substantially disk shaped module.

2. Description of the Prior Art

Crossflow separating processes operating with membrane modules of this type are used for example for clarifying fruit juices. For this purpose, the unclarified fruit juice is introduced via a feed line into the tube membranes, in the course of which part of the fruit juice having substances of small particle size (down to molecular size), known as the permeate, penetrates the walls of the tube membranes and passes into a permeate tank, while part of the fruit juice having solid substances of large particle size, the retentate, is discharged via a discharge line from the tube membranes and passed on for further processing. In the case of such separation or clarification of the fruit juice, clogging of the walls of the tube membrane acting as filters can be avoided by solid substances that are deposited on the tube walls being detached by the fruit juice flowing through the tube membranes and removed again from the tube membranes.

To obtain a satisfactory filtering performance of the membrane modules used in the crossflow separating processes described, a comparatively large filter area must be provided. Furthermore, it must be ensured that the tube membranes have a sufficiently small inside diameter to obtain a sufficiently small ratio of the interior volume of the tube membranes to the effective filter area that is required to obtain a satisfactory filtering performance. In this case, a satisfactory filtering performance can only he achieved when a plurality of tube membranes are flowed through in parallel. To obtain a compact construction of corresponding separating devices that is required for practical use, U.S. Pat. No. 6,203,707 discloses the use of curved tube membranes instead of straight tube membranes. In the case of a first embodiment of the separating devices described in the cited document, tube membranes which run helically around a common helix axis are used. To avoid damage to the tube membranes, it is proposed in this context to combine the individual tube membranes running around the common helix axis into clusters in which individual tube membranes are twisted in the manner of a rope.

In the case of a further embodiment of the separating devices described in the cited document, the individual tube membranes form membrane modules of the type described at the beginning in which the individual tube membranes run spirally around a common axis to form flat, disk-shaped modules. Membrane modules of this type can be used in particular whenever separating devices of a flat form are required. For this purpose, to obtain a sufficient filtering performance per membrane module, a plurality of tube membranes may be wound spirally into one or more layers parallel to one another.

However, when producing the membrane modules last described, it has been found that the membrane modules obtained using conventional winding devices deviate from the desired shape in many cases, because there are great problems in guiding the individual tube membranes in the winding device. This is attributable to the fact that the diameter of the finished membrane modules is particularly great in comparison with the axial length, so that even small tensile or compressive stresses in the axial direction of the modules cause individual tubes to depart from the winding plane. For this reason, it is generally required when producing the membrane modules described at the beginning for the individual tube membranes to be wound by hand or for particularly complex control techniques to be used. In addition, it is generally also necessary for a radially extending adhesive attachment to be performed between the individual tube membranes at several points within the individual membrane modules during the winding operation. After completion of the known membrane modules of the type described above, it is additionally also necessary for these membrane modules to be handled especially carefully, in order that the individual tube membranes are not displaced from their predetermined position.

SUMMARY OF THE INVENTION

In view of the problems of the prior art explained above, the invention is based on the object of providing a membrane module of the type described at the beginning which can be produced automatically without especially complex control techniques and has satisfactory dimensional stability.

This object is achieved according to the invention by a development of the known membrane modules in which, at least in the course of part of their substantially spiral progression to form a tube membrane strand, at least two of the tube membranes run helically around a common helix axis, preferably are twisted.

This invention is based on the realization that twisting the individual tube membranes produces a profiled outer contour of the individual tube membrane strands which, when these tube membrane strands are spirally wound, leads to a stabilization of the membrane module obtained in this way, because the bounding surfaces of successive windings of the tube membrane strands of the membrane module lie against one another to a certain extent with positive engagement, whereby increased stability under loads acting on the module in the direction of the spiral axis is obtained. This has the effect on the one hand that the individual tube membranes can be prevented from departing from their desired position during the winding operation itself. It also makes it possible to prevent the individual tube strands or windings from being offset from their desired position during handling of the membrane modules. On the other hand, the use of twisted tube membranes for the production of membrane modules in which the individual tube membranes run spirally around a common axis also has the effect in most cases that the corresponding winding device only has to be fed one strand, which already has sufficient intrinsic stability, thereby simplifying the winding operation, so that this winding operation can be carried out automatically with control techniques of comparatively low complexity. At the same time, the number of adhesive connections between the individual tube membranes and/or spiral windings can be reduced without any appreciable loss of stability, it being possible under certain circumstances to dispense entirely with such adhesive connections or to use connections of a different kind. In the production of membrane modules according to the invention, the individual tube membranes are automatically wound into two layers by the rope-like twisting, so that, with a two-layered winding of this type, it is also possible to dispense with the inner reversal in the direction of lay of the individual tube membranes by 180° which is required in the case of conventional membrane modules to obtain a two-layered winding. This has the effect of additionally simplifying the winding operation and the complexity of the apparatus for the winding device.

It is customary for a multiplicity of membrane modules to be operated in parallel in a device for separating substance mixtures in the crossflow process, only one feed line and one discharge line being provided for all the tube membranes. In the case of devices of this type, maintenance work requiring the exchange of individual membrane modules can be significantly simplified if, along a first portion, the tube membranes of the module run spirally around the common axis in such a way that the radius of curvature decreases in the direction of flow of the fluid flowing through the tube membranes and, along a next-following second portion, they run spirally around the common axis in such a way that the radius of curvature increases in the direction of flow. This course of the tube membranes achieves the effect that the substance mixture initially flows in the membrane module in the direction of the common axis and, after that, is discharged again spirally from this common axis, so that both the feed line and the discharge line can be arranged outside the membrane module. This arrangement of the feed line and discharge line makes it possible, after releasing the tube membranes, or tube membrane strands, for individual membrane modules to be exchanged without hindrance by the feed line and the discharge line, even when the membrane module to be exchanged is arranged between two further membrane modules in the direction of the common axis.

In the case of this embodiment it has proven to be particularly favorable if the first portion and the second portion have approximately the same outside diameter.

A further simplification of the production of membrane modules according to the invention can be achieved while simultaneously ensuring homogeneous filter effectiveness for all the tube membranes if all the tube membranes of the module are of the same length.

As already explained at the beginning, a particularly high filter performance is achieved with membrane modules according to the invention if the membrane module comprises a multiplicity of tube membranes.

These tube membranes may be realized in the membrane module according to the invention in the form of at least two strands which run in parallel, at least along part of their spiral progression, and comprise in each case at least two tube membranes twisted in the manner of a rope. In the case of the embodiment of the invention last described, a membrane module in which all the tube membranes are of approximately the same length is obtained if the strands run next to one another in a plane running perpendicular to the common axis, the radial sequence of the strands being reversed between the first portion and the second portion or the strands being arranged one behind the other in the direction of the common axis.

Further stabilization is achieved if the membrane module according to the invention has at least two strands, each comprising at least two tube membranes twisted in the manner of a rope, the helix axes of the strands running helically around a further common helix axis. In this case, it has proven to be particularly advantageous if the module has at least two strands, each of which comprises a plurality of tube membranes, preferably three tube membranes. Furthermore, it has proven to be favorable with regard to the desired stability of membrane modules according to the invention if the tube membranes of at least one strand run helically around a carrier of a material that is more rigid in comparison with the material of the tube membranes.

When membrane modules according to the invention are used, the filter effect can be increased if the membranes of at least one strand run helically around in such a way that, when there is a flow through the membranes, a Dean flow occurs in the membranes. The occurrence of Dean flows in devices for crossflow filtration is described, for example, in U.S. Pat. No. 5,626,758. The disclosure of this document is incorporated in this description by express reference with regard to the arrangement of tube membranes required to obtain a Dean flow.

When producing tube membrane strands from a multiplicity of tube membranes running helically around a common helix axis, there is the problem that the twisting causes the individual tube membranes to undergo a different change in their length along the common helix axis. As a result, an offset of the end faces of the individual tube membranes of the individual tube membrane strands is produced along the common helix axis. This offset can be reduced or eliminated if, for producing membrane modules according to the invention, use is made of a membrane helix unit with at least three tube membrane strands, each of which has a plurality of tube membranes, preferably three tube membranes, running helically around a common helix axis, the helix axes of the individual strands running helically around a further common helix axis. In a further refinement of the invention, it is also possible for the membrane helix unit to have $3^n$ tube membrane strands, each of which has a plurality of tube membranes, preferably three tube membranes, running helically around a common helix axis, the individual tube membrane strands being combined into $3^{n-1}$ groups of in each case $3^{n-1}$ tube membrane strands, which run helically around a main helix axis. In this case, each group of tube membrane strands may in turn have three subgroups of in each case $3^{n-2}$ tube membrane strands, which run helically around a common secondary helix axis.

In the case of membrane modules or membrane helix units according to the invention, the axial length of the individual tube membranes for a helical progression around the helix axis (length of lay) is preferably at most 10 times the outside diameter of the tube membrane. It has been found that the separating device operates particularly effectively in the case of this refinement of the invention.

Furthermore, it has proven to be expedient if the radius of curvature of the common helix axis in the course of the spiral progression is at least equal to 10 times the inside diameter of the individual tube membranes. Here, too, it is true that this refinement operates particularly effectively. With regard to the overall effectiveness of a separating device produced using membrane modules according to the invention, it has proven to be particularly favorable if the length of an individual tube membrane is at least 3000× its inside diameter.

It is preferred according to the invention for the total number of the individual membranes in a module to be greater than 15. Compliance with this dimensioning rule leads to a particularly effective separating device.

Additional stabilization of membrane modules according to the invention can be achieved if they are surrounded at least in certain portions by a frame-shaped holder. A holder of this type not only gives said arrangement great stability but also contributes to maintaining distances between the individual tube membranes and/or membrane modules that are prescribed and advisable or even necessary with regard to the effectiveness of the device. A further increase in stability can be obtained if at least two of the membranes of a membrane module are securely connected to one another. As a result, not only is greater stability achieved, but also a prescribed distance between the individual tube membranes is fixed.

The invention also relates to a method of producing tube membranes running helically around a helix axis using an extrusion die for plastic and a receiving device for the capillaries or membranes.

According to the invention, the receiving device for the capillaries or membranes extruded from the extrusion die rotates during the extrusion. The method ensures particularly simple production, in particular if two, three or four tubular membranes are extruded at the same time. The rotational movement of the receiving device has the effect of imparting the twisting to the membranes automatically and permanently. Consequently, no special method step is needed to produce the twisting. Alternatively or in addition, it is also possible in this case to provide for the extrusion die to rotate. The same effects are achieved in this way as in the case of the refinement in which the receiving device rotates.

The invention is explained in more detail below with reference to the drawing, to which reference is expressly made with regard to all the details essential for the invention and not highlighted in the description.

DETAILED DESCRIPTION OF THE PRESENTLY PREFERRED EMBODIMENTS

Figure 1:
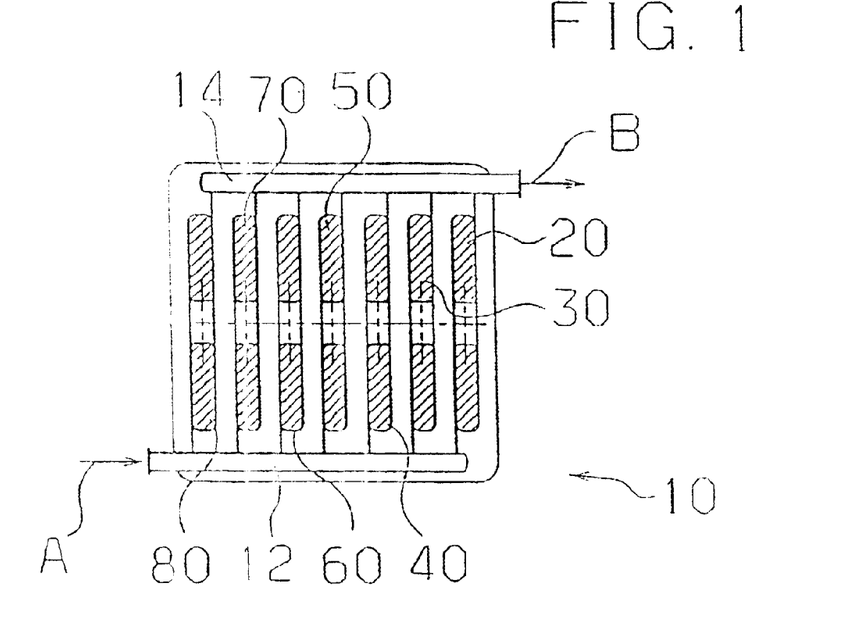
FIG. 1 shows a schematic plan view from above of a separating device equipped with a total of seven membrane modules according to the invention.
Figure 2:
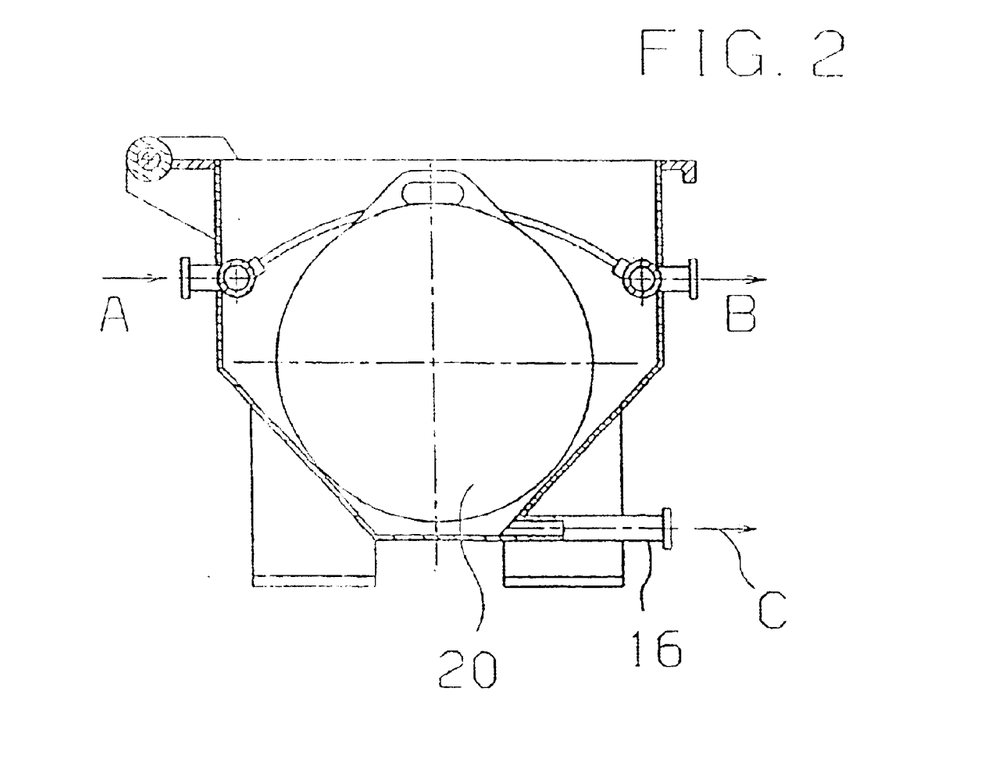
FIG. 2 shows a view from the front of the separating device according to FIG. 1.

The separating device represented in FIGS. 1 and 2 substantially comprises a collecting container 10 and a total of seven membrane modules 20, 30, 40, 50, 60, 70 and 80. Each of these membrane modules 20 to 80 is designed in the form of a flat disk. A substance mixture to be separated with the aid of the membrane modules is fed to a feed line 12, to which individual membrane modules 20 to 80 are connected. After passing through the membrane modules, the unseparated part of the substance mixture (the retentate) is discharged by a discharge line 14, as represented in FIGS. 1 and 2 by the arrows A and B. The part of the substance mixture that is separated by the membrane modules 20 to 80 (the permeate) is collected in the container 10 and drawn off from the container via a further discharge line 16, as indicated in FIG. 2 by the arrow C.

The construction of the individual membrane modules of the separating device represented in FIGS. 1 and 2 is explained below on the basis of FIG. 3 by way of example for the membrane module 20. According to this, the membrane module 20 comprises a strand of a total of three tube membranes 22, 24, 26, which run helically around a common helix axis W. This common helix axis W has a first portion 20a, which runs spirally around a spiral axis S (cf. FIG. 3b) and in which the radius of curvature of the helix axis steadily decreases in the direction of flow A of the substance mixture flowing through the tube membranes 22, 24 and 26, so that the substance mixture flows in the direction of the common axis S along this first spirally running portion 20a. Following the first spirally running portion 20a, the helix axis goes over into a second spirally running portion 20c, in the same direction of rotation. The portion 20b has been pulled vertically apart in the drawing for better explanation. In practice, the spiral goes over into the second plane in an obliquely rising manner. Along this second spiral portion 20c, the radius of curvature of the helix axis W steadily increases in the direction of flow of the substance mixture flowing through the tube membranes 22, 24 and 26, so that the substance mixture flows radially outward with respect to the axis S along this second portion and can be discharged with the aid of a discharge line arranged radially outside the spirally running portions 20a and 20c.

This has the overall effect of making possible the arrangement of the membrane module schematically represented in FIG. 3b in the form of a flat disk, it being possible for both the feed line and the discharge line to be arranged outside the flat disk, as represented in FIGS. 1 and 2.

Figure 3:
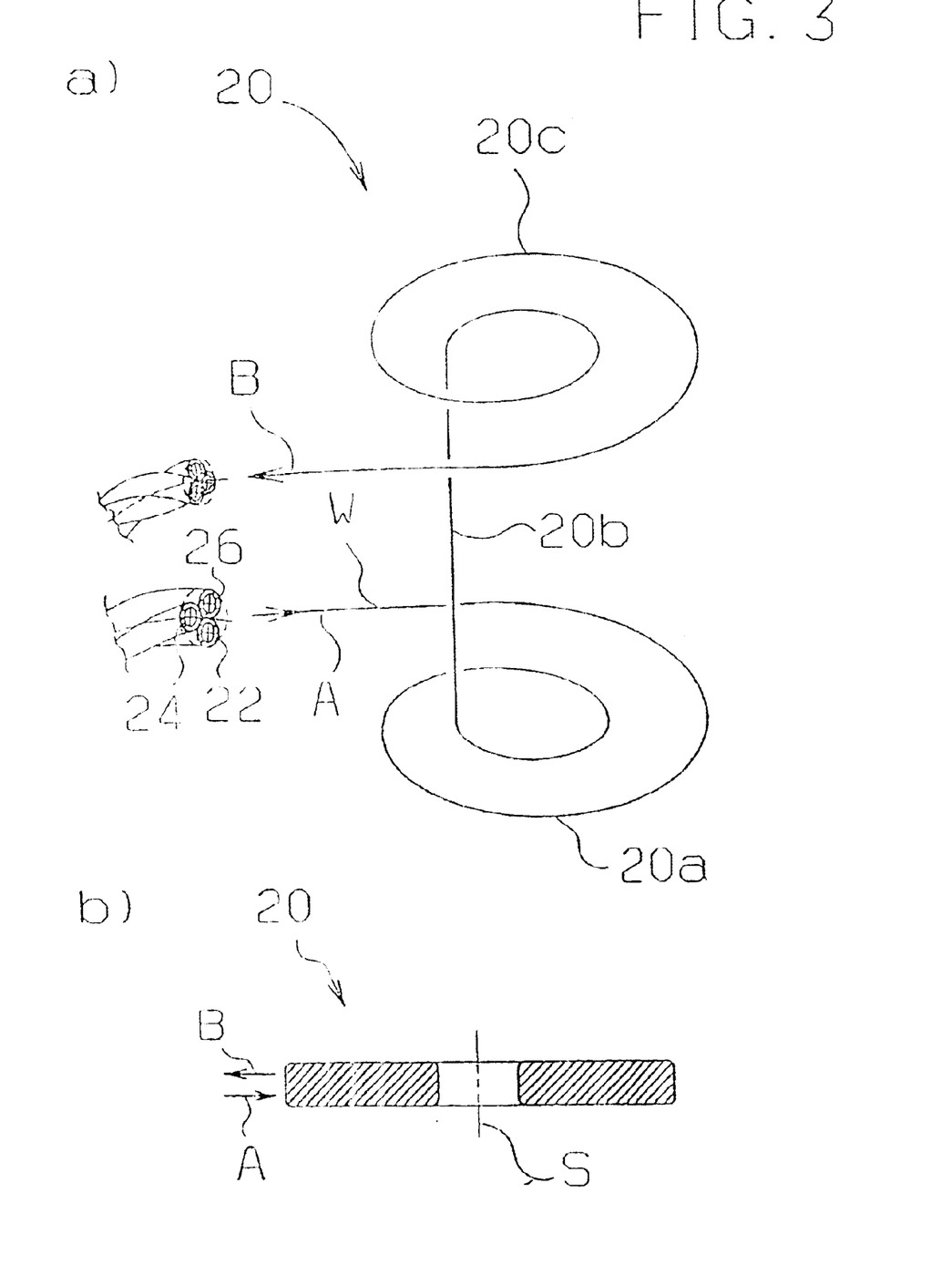
FIG. 3 shows a schematic representation of one of the membrane modules of the separating device according to FIG. 1.
Figure 4:
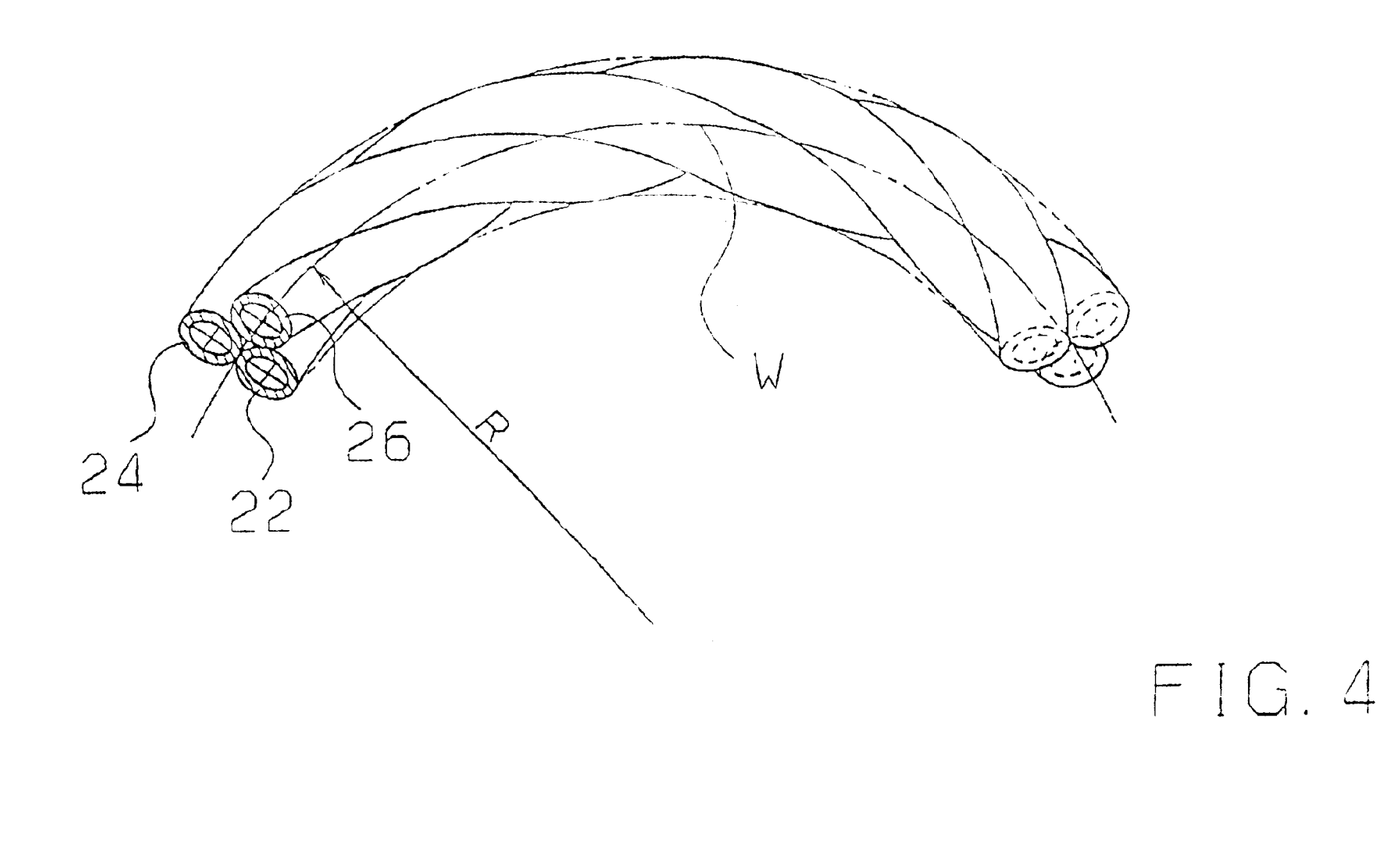
FIG. 4 shows a representation of a detail of a tube membrane strand of the membrane module represented in FIG. 3, FIGS. 5 to 9 show sectional representations of various embodiments of tube membrane strands according to the invention.

According to the view of a detail represented in FIG. 4 of the tube membrane strand shown in FIG. 3, the three tube membranes 22, 24 and 26 are twisted with one another in a rope like manner, so that they run helically around a common helix axis W. In this case, this helix axis is curved in a way corresponding to the spiral progression along the portion 20a and 20c, the radius of curvature R decreasing constantly along the spiral portion 20a and increasing constantly along the spiral portion 20c. In the case of the embodiment of the invention represented in FIG. 4, it is also ensured that the longitudinal axes of the individual tube membranes 22, 24 and 26 are at the same distance from the helix axis W.

Figure 5:
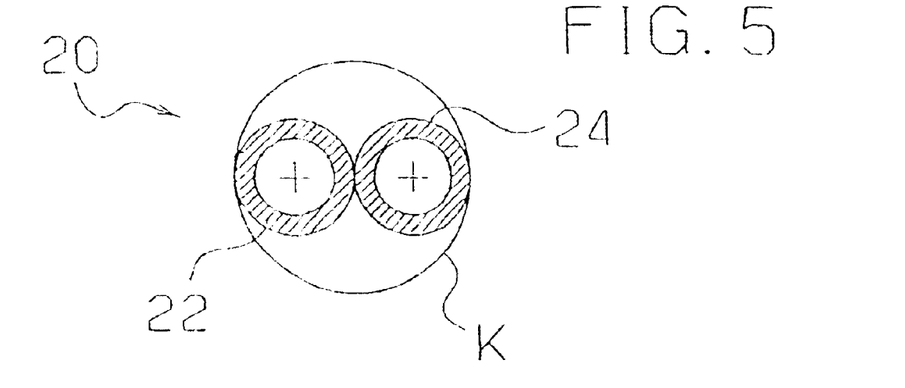

In the case of the embodiment of the invention represented in FIG. 5, only two tube membranes 22 and 24 are twisted to form a tube membrane strand 20. The envelope of the tube membrane strand is indicated in FIG. 5 by the circle K.

Figure 6:
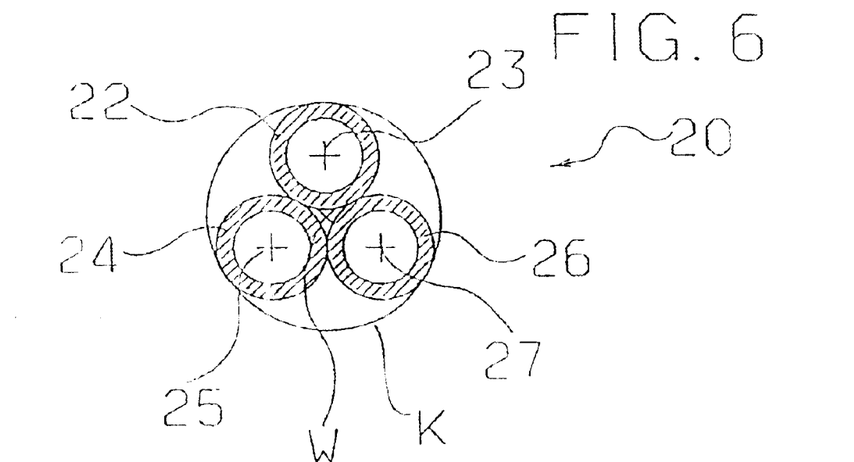

The tube membrane strand represented in FIG. 6 corresponds to the tube membrane strand explained on the basis of FIG. 4, the envelope of the tube membrane strand also being indicated in this drawing by the circle K. It is also revealed particularly clearly in FIG. 6 that the longitudinal axes 23, 25 and 27 are at the same distance from the helix axis W in a sectional plane running perpendicular to the helix axis W.

Figure 7:
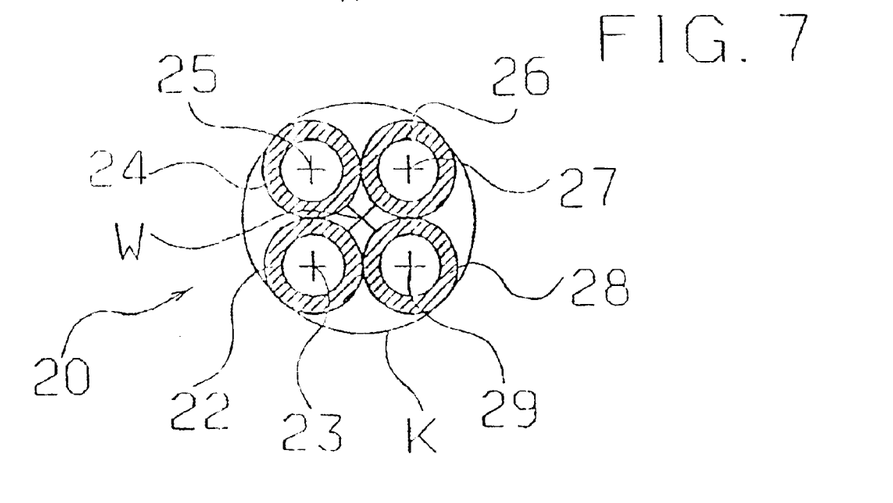

The embodiment of the invention represented in FIG. 7 comprises four tube membranes 22, 24, 26 and 28 running helically around a common helix axis W, the envelope of the tube membrane strand formed by these tube membranes also being indicated here by a circle K. It is also the case in this embodiment of the invention that the longitudinal axes 23, 25, 27 and 29 of the tube membranes 22, 24, 26 and 28 are at the same distance from the helix axis W in a sectional plane running perpendicular to the helix axis W.

Figure 8:
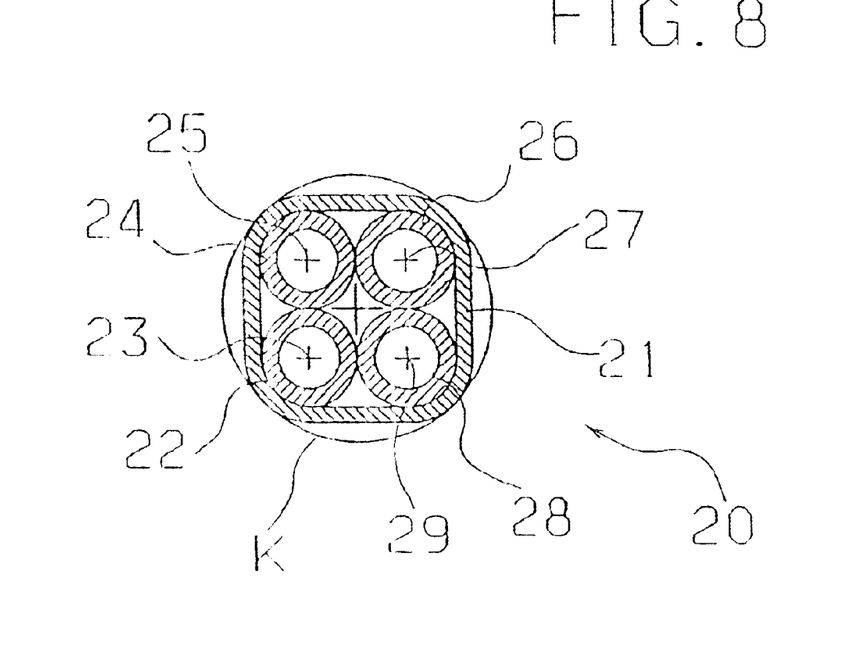

The embodiment of the invention represented in FIG. 8 substantially corresponds to the embodiment represented in FIG. 7, with the additional provision of a holder 21, with which the tube membranes 22, 24, 26 and 28 are held together. This frame-shaped holder 21 serves at the same time as a stabilizing device and spacer to ensure a prescribed distance between the individual windings of the spirally running tube membrane strand.

Figure 9:
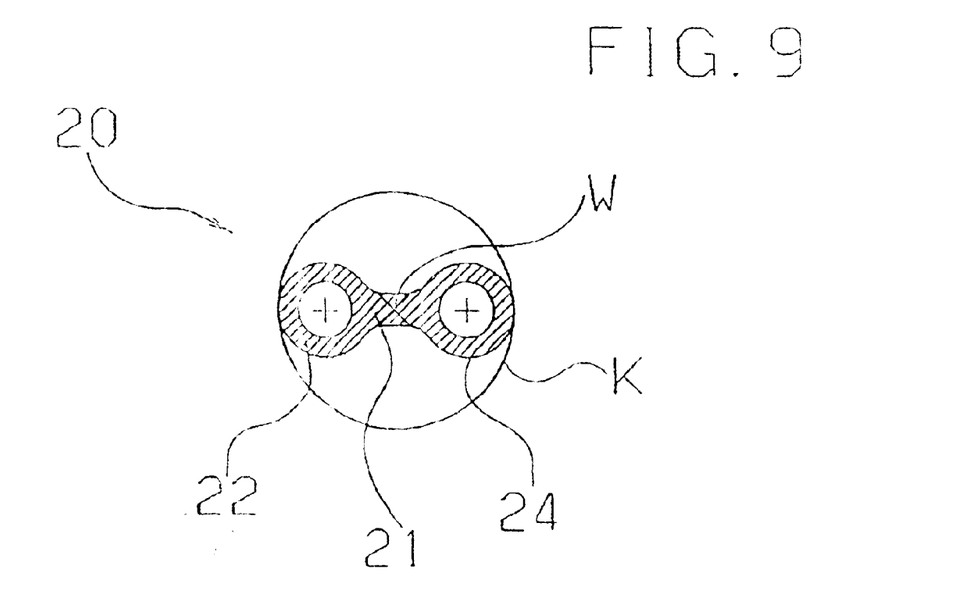

FIG. 9 shows a further embodiment of the invention, in which two tube membranes are helically twisted to form a tube membrane strand. In the case of this embodiment of the invention, stabilization takes place with the aid of a cross-piece 21 connecting the two tube membranes 22 and 24 to one another. This cross-piece 21 crosses the helix axis W of the tube membrane strand and may be configured in one piece with the two tube membranes 22 and 24.

Figure 10:
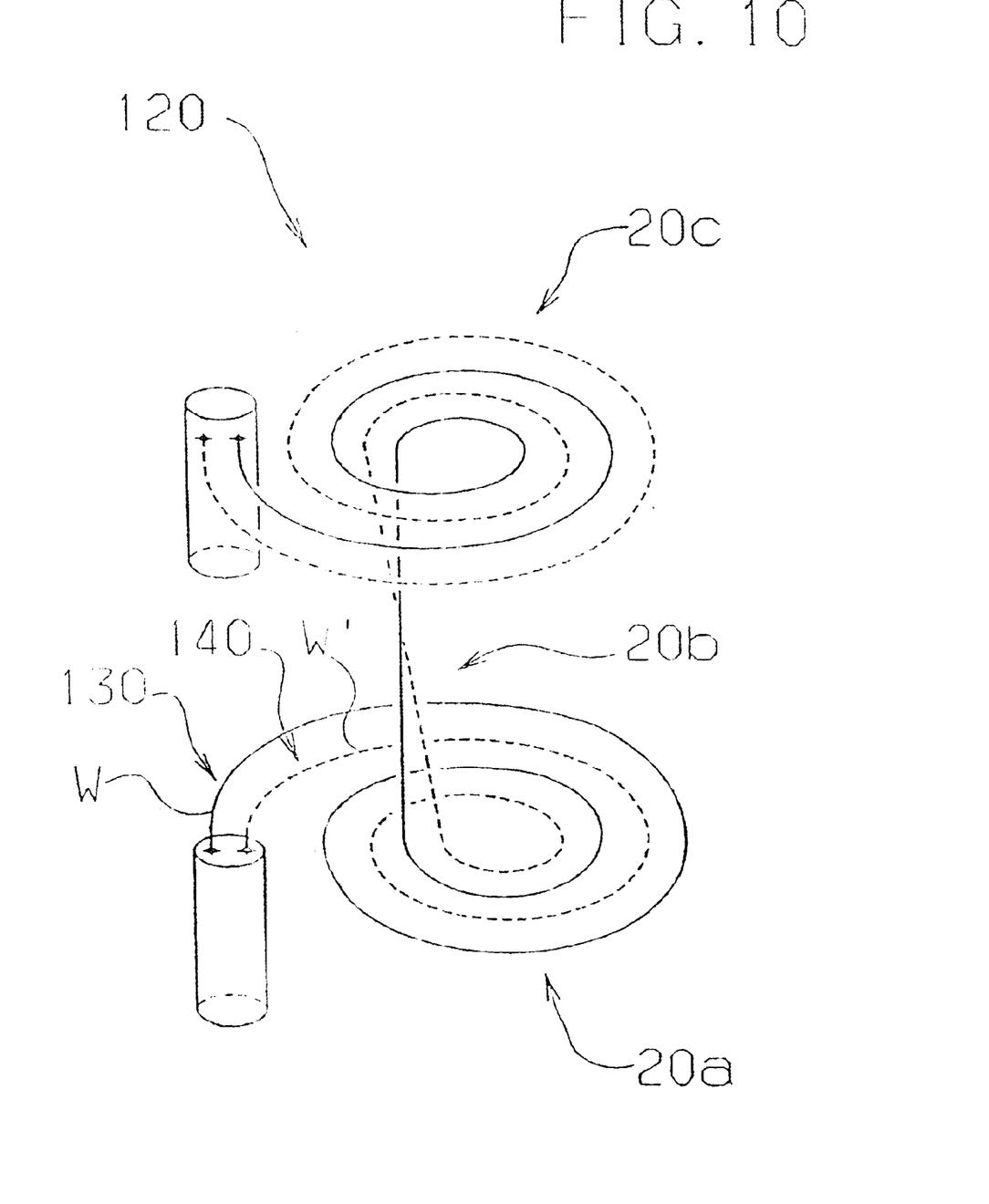
FIG. 10 shows a schematic representation of a membrane module according to a further embodiment of the invention.

FIG. 10 shows a membrane module 120 according to the invention with two tube membrane strands 130 and 140. In the case of each of these tube membrane strands 130 and 140, the helix axis W and W' proceeds in a way corresponding to the embodiment of the invention explained on the basis of FIG. 3 along a first spirally running planar portion 20a, a deflecting portion 20b and a second spirally running planar portion 20c, the strands 130 and 140 being arranged next to one another in a plane running perpendicular to the spiral axis and the radial sequence of the strands 130 and 140 being reversed between the first portion and the second portion.

In particular with the embodiment of the invention explained on the basis of FIG. 10, it is possible to produce disk-like windings of tube membranes with a large outside diameter and large membrane area. This is a particular advantage when constructing vertical filter systems with large filter areas. In this case, the aim is to optimize as far as possible in direction 1 the ratio of the overall height to the diameter of a plurality of membrane modules arranged one on top of the other, since the overall height available (height of the factory) is small in many plants where the method is used. For this purpose, membrane modules with the following dimensions can be used, for example:

tube membrane inside diameter: 5.5 mm
tube membrane outside diameter: 8.5 mm
number of twisted tubes per strand: 3
number of spirally wound layers per disk: 2
disk thickness with fixing: 39 mm
inside diameter of the disk: 250 mm
individual tube length: 30 m In this case, the inside diameter refers to the diameter of a central opening in the module.

With these dimensions, modules which have a plurality of tube membrane strands wound next to one another can be produced. In this case, a filter arrangement with an overall filter area of approximately 220 $m^2$ can be produced as follows:

| Filter system with 220 $m^2$ of filter area comprising sprially wound disks placed one on top of the other | 1 strand twisted with 3 tubes | 2 strands each twisted with 3 tubes | 4 strands each twisted with 3 tubes |
| --- | --- | --- | --- |
| Area per winding in $m^2$ | 1.62 | 3.11 | 4.67 |
| Outside diameter in mm | 635 | 870 | 1055 |
| Number of modules arranged one on top of the other | 135 | 70 | 47 |
| Overall structural height mm | 5296 | 2730 | 1037 |

Finally, the further advantages of membrane modules according to the invention can also be mentioned:

The permeate outflow between the individual wound layers is facilitated.

The effectiveness of an intermittent permeate counter-pressure for the dislodgement of the covering layers on the membrane surface is improved.

The chemical cleaning of the outer side of the membrane tubes is facilitated.

Figure 11:
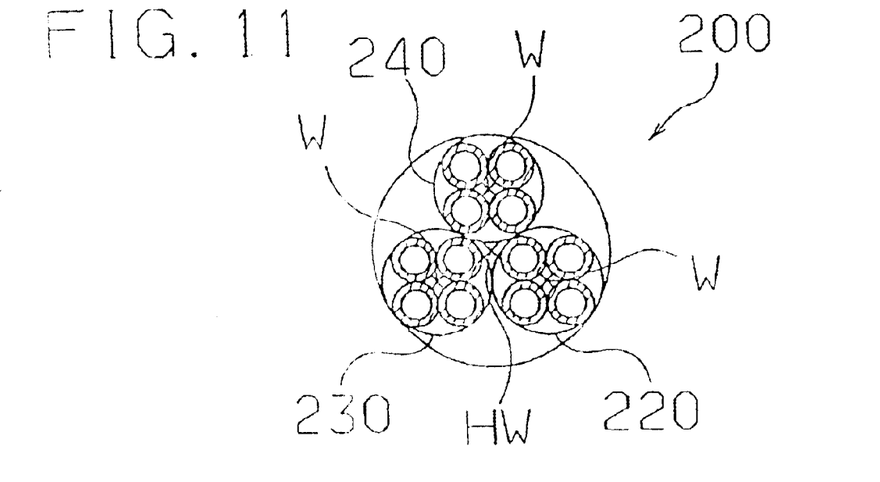
FIG. 11 shows a sectional representation of a membrane helix unit according to the invention.

The membrane helix unit 200 represented in FIG. 11 comprises a total of 12 tube membranes, which have been combined into three groups 220, 230 and 240 with four tube membranes in each case. The tube membranes of each of the groups 220, 230 and 240 run helically around a helix axis W in each case, the distances between the longitudinal axes of the tube membranes of each group and the corresponding helix axis W being equal in a sectional plane running perpendicular to the helix axis. The helix axes W of the tube membrane strands formed by the groups 220, 230 and 240 run helically around a main helix axis HW, all the helix axes W being at the same distance from the main helix axis HW in a sectional plane running perpendicular to the main helix axis HW. This arrangement of the individual tube membranes ensures that the twisting with respect to the helix axes W or the main helix axis HW causes the same shortening for all the tube membranes in a direction prescribed by the main helix axis HW, so that no axial offset is produced between the end faces of the individual tube membranes.

Figure 12:
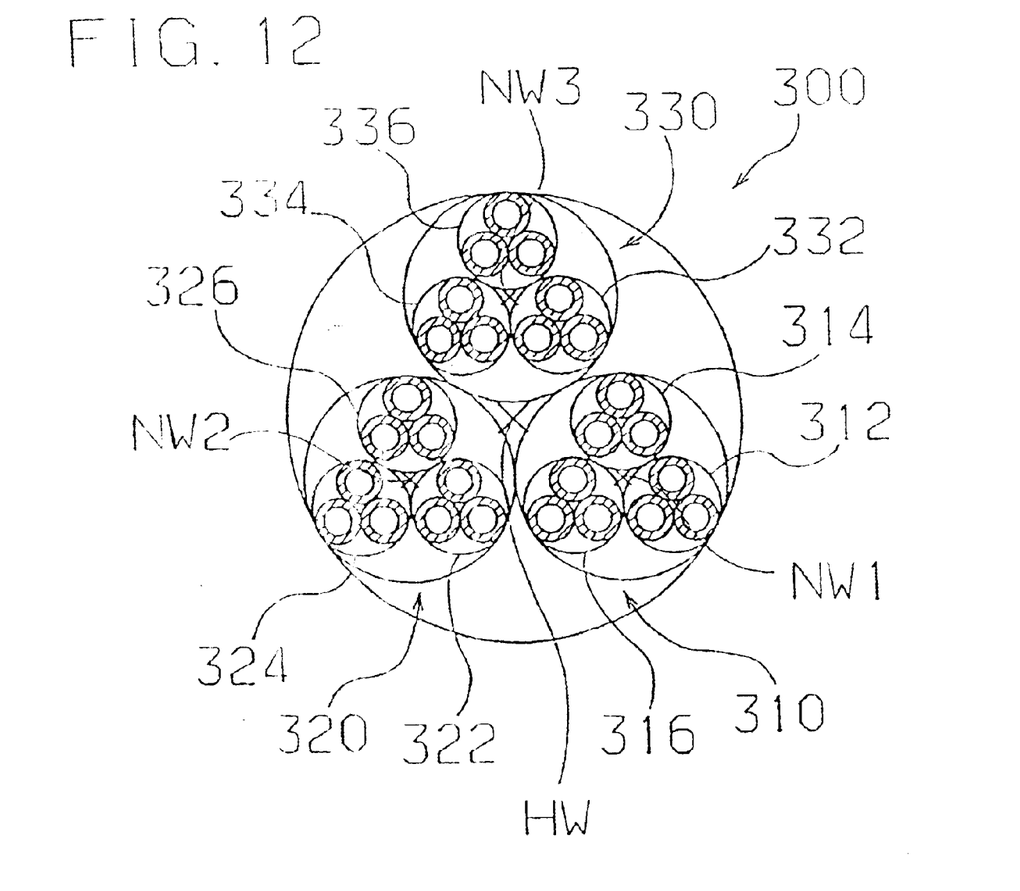
FIG. 12 shows a sectional representation of a membrane helix unit according to a further embodiment of the invention and FIG. 13 shows a schematic representation of the extrusion process according to the invention.

A further embodiment of the invention, in which this axial offset is prevented, is represented in FIG. 12. The membrane helix unit represented in this drawing has a total of nine tube membrane strands, each of which comprises three tube membranes running around a common helix axis. These nine tube membrane strands are combined into three groups 310, 320 and 330, each of which has three tube membrane strands. In this case, the helix axes of the tube membrane strands 312, 314 and 316 of the first group 310 run around a first secondary helix axis NW1, the tube membrane strands 322, 324, 326 of the second group 320 run around a second secondary helix axis NW2 and the tube membrane strands 332, 334, 336 of the third group 330 run around a third secondary helix axis NW3. In this case it is ensured that the envelopes of the tube membrane strands of each group lie against one another, so that all the helix axes of the tube membrane strands of each group are at the same distance from the corresponding secondary helix axis. The secondary helix axes NW1, NW2 and NW3 run helically around a main helix axis HW. In this case, it is also ensured here that the envelopes of the individual groups of tube membrane strands lie against one another, so that all the secondary helix axes NW1, NW2 and NW3 are at the same distance from the main helix axis HW.

The arrangement of tube membranes represented on the basis of FIG. 12 can be continued by combining three arrangements of the type represented in FIG. 12 in such a way that their main helix axes run around a further helix axis, so that the membrane module obtained in this way comprises a total of 27 tube membrane strands, each of which has three tube membranes. In this way, further arrangements with $3^n$ tube membrane strands can be put together, each of which has a plurality of tube membranes, preferably three tube membranes, running helically around a common helix axis, the individual tube membrane strands been combined into three groups of $3^{n-1}$ strands in each case, which run helically around a main helix axis, it being possible in turn for each of these groups to have $3^{n-2}$ tube membrane strands, which run helically around a common secondary helix axis, it in turn being possible for each of these subgroups to have $3^{n-3}$ tube membrane strands, which run helically around a common sub-helix axis, and so on, n designating a natural number.

Figure 13:
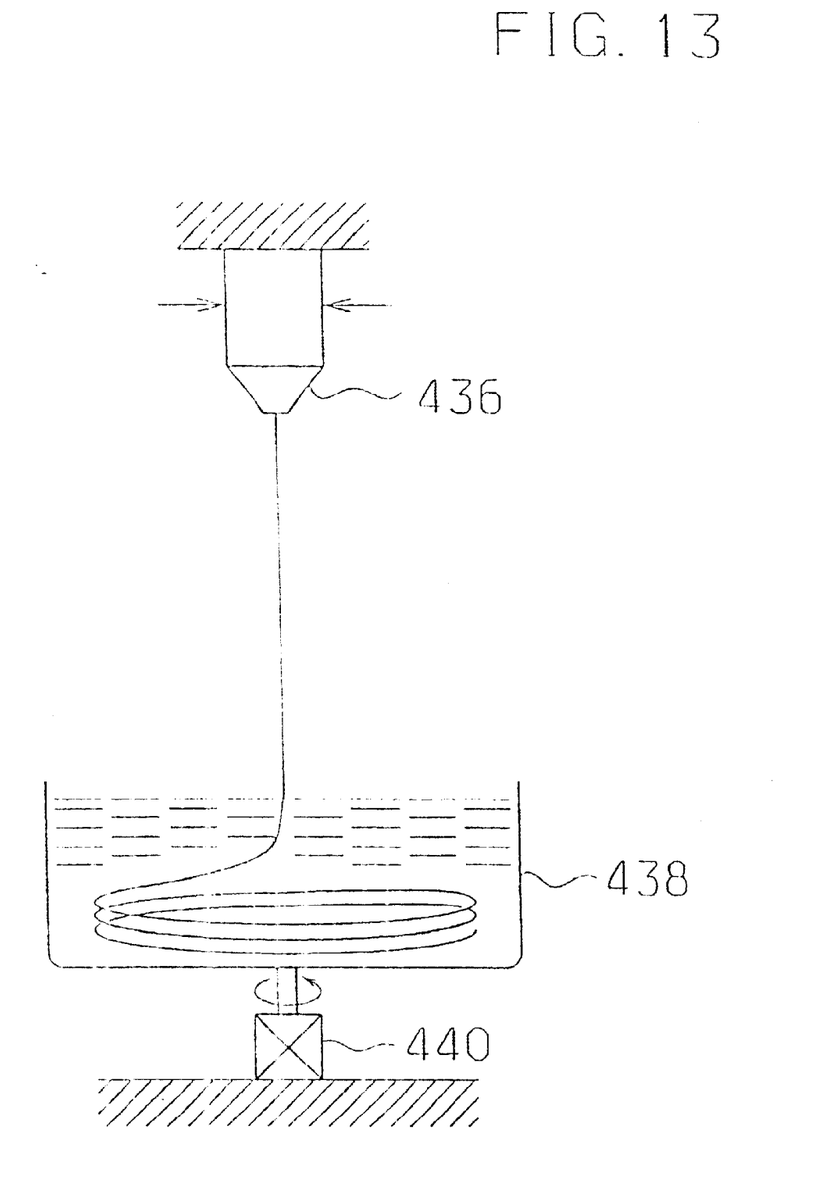

An exemplary embodiment of the method of production according to the invention is schematically shown in FIG. 13. According to this, an extrusion die 436 is provided with three outlets. Furthermore, a container 438 serving as a receiving device is provided. The container is driven in a rotating manner by means of a motor 440. If the container 438 rotates during the extrusion through the extrusion die 435, a membrane helix unit is obtained, made up of tubular membranes twisted with one another, which is deposited in the container 438 in the manner of a lasso. The rope-like twisting imparted in this way to the membrane helix unit is permanent. A special twisting operation is not required.

The features of the invention disclosed in the above description and the claims and the drawing are essential, both individually and in any desired combination, for the invention to be realized in its various embodiments.

What is claimed is:

1. A membrane module for a device for separating substance mixtures in a crossflow process, said module comprising:
   at least one tube membrane strand having planar portions wherein the strand runs substantially spirally around a common spiral axis in each said planar portion, said planar portions forming a disk shaped module,
   each said tube membrane strand comprising a plurality of tube membranes which are twisted in a rope-like manner to run helically around a first common helix axis.

2. A membrane module as in claim 1 wherein each said strand comprises:
   a first planar portion which runs spirally around the common axis with a radius of curvature which decreases in the direction of flow of fluid through the membranes, and
   a second planar portion which runs spirally around the common axis with a radius of curvature which increases in the direction of flow of fluid through the membranes.

3. A membrane module as in claim 2 wherein said first planar portion and said second planar portion each have an outside diameter, said outside diameters of said first and second planar portions being approximately the same.

4. A membrane module as in claim 1 wherein all of the tube membranes in a module have the same length.

5. A membrane module as in claim 1 comprising at least two of said strands running in parallel.

6. A membrane module as in claim 2 comprising at least two of said strands running in parallel, the strands in each planar portion running next to one another in a plane running perpendicular to the common axis, each said planar portion having a radial sequence of strands, the radial sequence of strands in the second planar portion being the reverse of the radial sequence of strands in the first planar portion.

7. A membrane module as in claim 5 wherein said strands are arranged one behind the other in the direction of the common spiral axis.

8. A membrane module as in claim 1 comprising at least two of said strands twisted in a rope-like manner to run helically around a second common helix axis.

9. A membrane module as in claim 8 comprising at least three of said strands.

10. A membrane module as in claim 1 wherein each of said strands further comprises a carrier of a material that is more rigid than the tube membranes, said tube membranes running helically around said carrier.

11. A membrane module as in claim 1 wherein at least one of said strands comprises tube membranes which run helically in such a way that when there is a flow through the membranes, a Dean flow occurs in the membranes.

12. A membrane helix unit for a device for separating substance mixtures, said helix unit comprising:
    at least three tube membrane strands, each said tube membrane strand comprising a plurality of tube membranes which run helically around a common primary helix axis, each tube membrane having a wall which passes particles smaller than a certain size,
    each said primary helix axis running helically around a secondary helix axis.

13. A membrane helix unit as in claim 12 comprising $3^n$ of said tube membrane strands in three groups of $3^{n-1}$ strands in each said group, said groups running helically around a main helix axis, the strands in each group running helically around a respective said secondary helix axis, wherein n is a natural number greater than or equal to 2.

14. A membrane helix unit as in claim 12 wherein each said group of strands comprises three subgroups of $3^{n-2}$ strands in each said subgroup, the strands in each subgroup running helically around a respective said secondary helix axis.

15. A membrane module as in claim 2 wherein the strand comprises a connecting portion inside the first and second planar portions, whereby the substance flows radially inward through the first planar portion through the connection, and radially outward through the second planar portion.

16. A membrane module as in claim 15 wherein the first planar portion is connected to a feed line and the second planar portion is connected to a discharge line.

* * * * *

UNITED STATES PATENT AND TRADEMARK OFFICE
CERTIFICATE OF CORRECTION

PATENT NO. : 6,863,813 B2
DATED : March 8, 2005
INVENTOR(S) : Eduard Hartmann It is certified that error appears in the above-identified patent and that said Letters Patent is hereby corrected as shown below:

<u>Title page,</u>
Item [73], should read:
-- [73] Assignee: Bucher Guyer AG, Schneisingen (CH) --.

Signed and Sealed this

Eighteenth Day of April, 2006

JON W. DUDAS
*Director of the United States Patent and Trademark Office*